Figure 1:
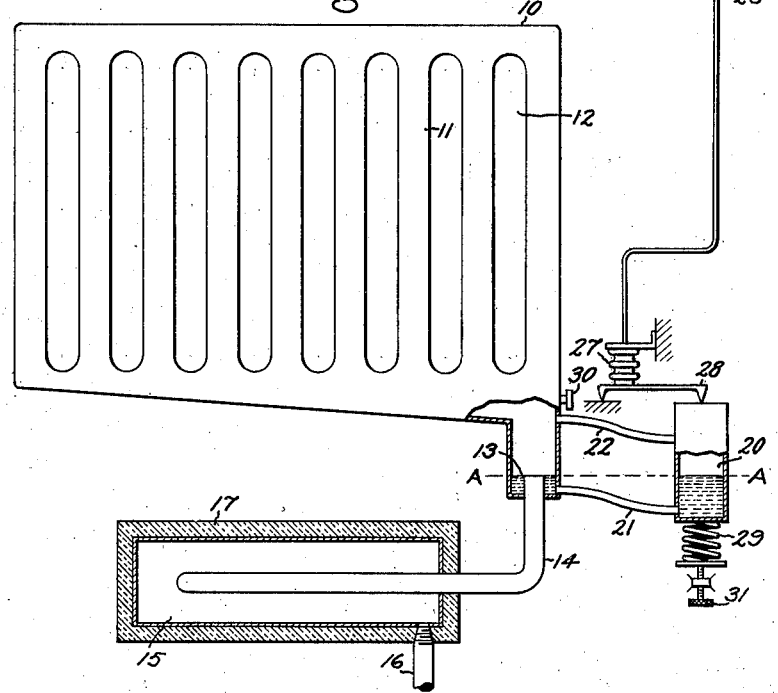

May 3, 1938.  M. E. FIENE  2,116,389
HEAT TRANSFER SYSTEM
Filed Aug. 23, 1935  2 Sheets-Sheet 1

Inventor:
Marcus E. Fiene,
by Harry E. Dunham
His Attorney.

May 3, 1938.  M. E. FIENE  2,116,389
HEAT TRANSFER SYSTEM
Filed Aug. 23, 1935   2 Sheets-Sheet 2
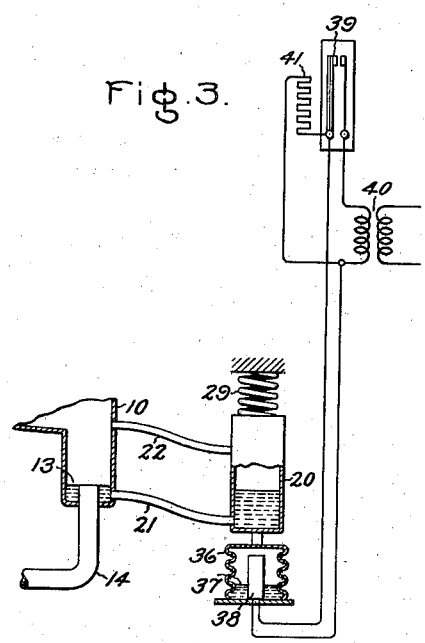
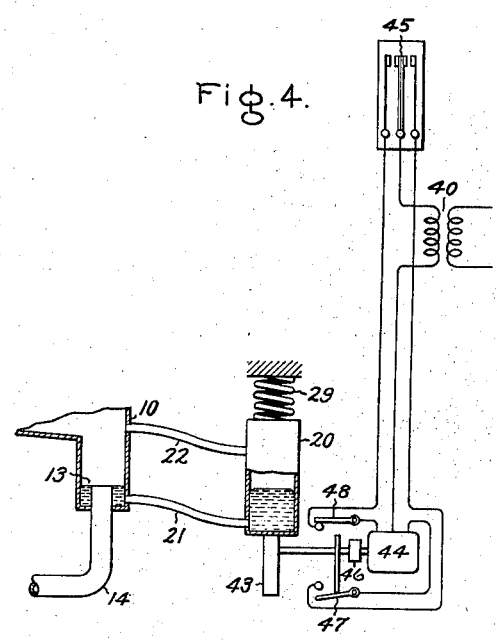
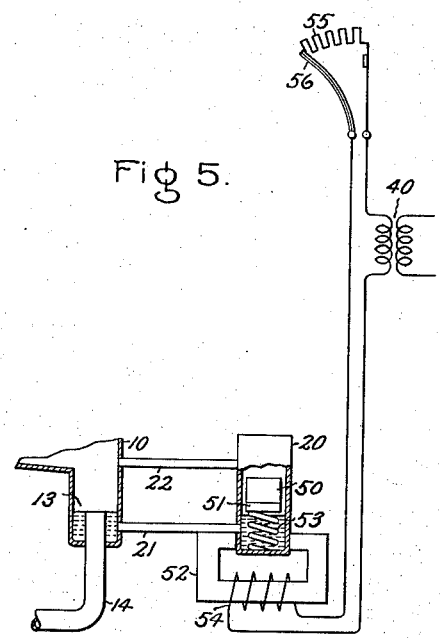
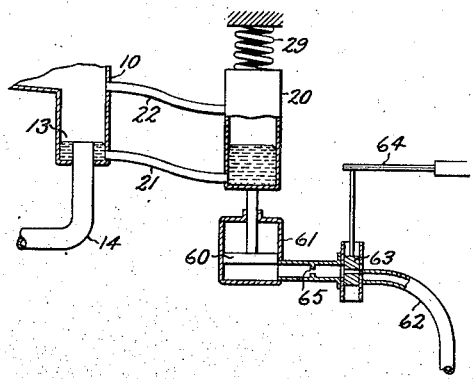
Inventor:
Marcus E. Fiene,
by Harry E. Dunham
His Attorney.

Patented May 3, 1938

2,116,389

UNITED STATES PATENT OFFICE 2,116,389

HEAT TRANSFER SYSTEM

Marcus E. Fiene, Ballston Lake, N. Y., assignor to General Electric Company, a corporation of New York Application August 23, 1935, Serial No. 37,519

11 Claims. (Cl. 236—36)

The invention relates to the transfer of heat, particularly by vaporization and condensation of fluid.

The principal object is to provide fluid vaporizing and condensing heat transfer apparatus having mechanism movable under the control of a thermostat responsive to a predetermined temperature condition for regulating the amount of vaporizable fluid active in transferring heat to regulate said temperature condition. In this way, thermostatically modulated heat transfer control for maintaining a constant temperature condition instead of the ordinary on and off control may be obtained.

My present invention is related to the constant temperature device of my invention disclosed and claimed in my prior application, Serial No. 691,262, filed September 27, 1933, and upon which Patent No. 2,026,423 was granted December 31, 1935 and also to the fluid vaporizing and condensing heat transfer system of my invention described and broadly claimed in my prior application, Serial No. 25,691, filed June 8, 1935.

In one form of constant temperature device disclosed in my above patent a hermetically sealed fluid vaporizing and condensing system was provided with a movable fluid control chamber. An expansible bellows device responsive to ambient temperature was provided for moving the fluid control chamber in order to vary the amount of fluid active in the constant temperature device and thereby compensate the device for variations in the ambient temperatures thereof. In the preferred form of fluid vaporizing and condensing heat transfer system disclosed in my application, Serial No. 25,691, a thermostatic control was provided capable of regulating the flow of heat from a source to a dissipating body without any moving parts. In the present invention, thermostatic regulation of the flow of heat from a source to a dissipating body by vaporization and condensation of fluid is obtained through the agency of mechanism movable under the control of a thermostat responsive to a temperature change resulting from the transfer of heat.

The present invention is of general application and the principle thereof may be carried out in various ways by those skilled in the art.

In carrying out the invention in a preferred form, an evacuated and sealed vapor heat transfer system having a fluid vaporizing and a vapor condensing surface is connected to receive heat from a suitable source, such as live steam, a flame or the like, and is provided with a fluid control chamber having thermostatically controlled mechanical means associated therewith for varying the amount of liquid in the chamber. With such arrangement the vaporizing surface receives heat from the source and the condensing surface releases the heat to the air, water or other medium which is to be heated. The liquid control chamber is so controlled and connected to the heat transfer system that substantially all of the fluid in the heat transfer system can condense and accumulate as liquid in the liquid control chamber. Under these conditions substantially no transfer of heat from the supply source can occur.

However, upon thermostatic operation of the control mechanism to vary the amount of liquid in the control chamber, liquid is expelled therefrom into the heat transfer system. Thereupon the expelled liquid is repeatedly vaporized and condensed and serves to effect the transfer of heat from the heat source through the vaporizing surface to the condensing surface. The present invention operates upon the fundamental principle that the temperature of the condensing surface is varied as a function of the amount of liquid expelled from the control chamber. Since the amount of liquid expelled from the control chamber is under thermostatic control, the temperature of the condensing surface thus can be varied directly, inversely, or as any other desired function of the variations in temperature conditions to which the thermostat is responsive.

Figure 2:
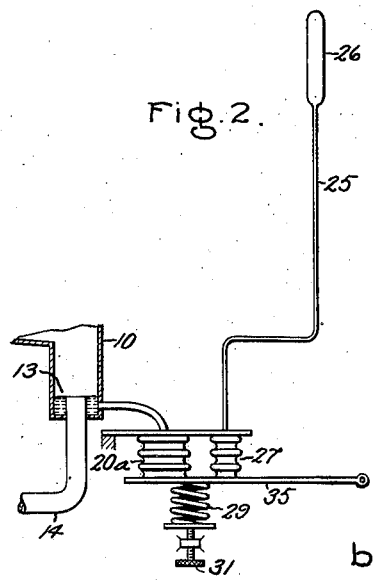

In the accompanying drawings, in which preferred forms of the present invention are illustrated, Fig. 1 shows diagrammatically a room air heating radiator with the fluid vaporizing and condensing heat transfer system therefor deriving heat from a steam chamber and having a fluid control chamber movable under the control of an expansible bellows type of thermostat responsive to the room air temperature; Fig. 2 shows a modification of the apparatus of Fig. 1 in which the fluid control chamber itself is in the form of a compressible bellows; Fig. 3 shows another modification in which an electrically heated expansible bellows is provided for moving the fluid control chamber under the control of a thermostatic electric circuit control switch; Fig. 4 shows a further modification in which an electric motor driven cam having a thermostatic control switch is provided for moving the fluid control chamber; Fig. 5 shows a further modification in which an electromagnet under the control of the thermostatic rheostat is provided for varying the fluid active in the heat transfer system; and Fig. 6 is still another modification in which an air pressure piston under the control of a thermostatically actuated three-way valve is provided for moving the fluid control chamber.

In Fig. 1 the room air heating radiator 10 is shown as of substantially the same type as disclosed in my prior application, Serial No. 25,691, which preferably is formed of suitably pressed metal plates welded together to form a series of interconnected vapor condensing columns 11 with open air circulating passages 12 therebetween to facilitate dissipation of heat from the radiator to the air. The bottom wall of the radiator 10 preferably is sloped so as readily to drain the condensed vapors into the condensate receiving tube or trap 13. The vaporizing tube 14 has the open end thereof extending upwardly through the bottom of the trap 13 while the other end which is closed slopes downwardly and extends into the steam chest 15. A supply of steam is maintained at all times in chest 15 by the steam supply pipe 16 which is connected to a suitable source not shown. The steam which condenses in chamber 15 is returned through pipe 16 or through a separate condensate return if desired. A suitable insulating covering 17 effectively prevents any dissipation of heat from the steam chest 15, the steam supply pipe 16 as well as from the vaporizing tube 14 except through the operation of the improved fluid vaporizing and condensing heat transfer system of the present invention in the manner described hereinafter.

A movable fluid control chamber 20 is connected by the flexible pipe 21 so as to drain fluid into and out of the condensate return trap 13 upon raising or lowering the chamber 20. A flexible pressure equalizing connecting tube 22 extends between the upper part of the movable control chamber 20 and the upper part of the condensate trap 13 so as to permit free flow of the fluid into and out of the control chamber 20.

In the arrangement shown in Fig. 1, an expansible fluid type of thermostat 25 having the bulb 26 thereof responsive to the heating action of the radiator 10 upon the room air and the bellows 27 thereof connected to operate through the lever 28 to move the fluid control chamber 20 against the bias of the spring 29.

The vapor condensing radiator 10, the condensate trap 13, the vaporizing tube 14, and the movable liquid control chamber 20 as well as the fluid drainage tube 21 and the pressure equalizing tube 22 are preferably all joined together and hermetically sealed by welding or brazing so that a closed vapor tight fluid controlled heat transfer system is obtained. This entire system is then evacuated of substantially all noncondensible gases through a suitable evacuating connection 30. Thereafter a predetermined charge of suitable vaporizable liquid such as water, alcohol, carbon tetrachloride or the like, is introduced into the closed system. The amount of this liquid charge is such as to insure that the entire effective heat transfer surface of the vaporizing tube 14 within the steam chest 15 may be effectively wetted under maximum heat transfer conditions. Ordinarily this condition may be obtained when the volume of the liquid charge is sufficient to fill the effective portion of the vaporizing tube 14 within the steam chest 15 substantially one third full due to the displacement or splashing of the liquid over the remaining surface when vaporization occurs.

Preferably the volume of the control chamber 20 is made somewhat larger than necessary to contain the total amount of liquid with which the system is charged. This insures that substantially all of the fluid in the system can be withdrawn into the control chamber 20 and thereby practically stop the transfer of heat from the steam chest 15 through the vaporized steam tube 14 to the radiator 10.

After the vapor system is exhausted and charged with the proper amount of fluid, any small amount of noncondensible gas which may happen to remain in the system will be forced by movement of the vapor into the upper portion of the radiator 10 without any serious interference with the operation of the vapor system. In order to reduce the noncondensible gases in the heat transfer system to a minimum, preferably the apparatus is baked or heated to a relatively high temperature during the exhausting process. This insures the decomposition of any organic material, such as oil or the like, which may happen to remain on the inner surfaces of the apparatus after the manufacturing process is completed.

In operation, when the temperature of the room air surrounding the bulb 26 of the thermostat 25 falls, the pressure within the thermostat bulb 26 decreases, thereby contracting the bellows 27. This permits the spring 29 to raise the movable control chamber 20 so as to drain fluid therefrom into the trap 13. The temperature value at which the thermostat 25 is set to admit fluid into trap 13 may be varied by adjustment of the tension of the spring 29 through the agency of the adjusting screw 31. When the level of the fluid in trap 13 rises above the open end of the vaporizing tube 14, as indicated by the dotted line A—A, the fluid then becomes active and flows to wet a portion of the vaporizing tube 14 extending within the steam chest 15. Thereupon the vaporizable fluid immediately absorbs heat and is vaporized. The expanding vapors pass into the interior of the room air heating radiator 10 to be condensed and transfer heat thereto. The condensed fluid immediately returns to the trap 13 and again flows to the vaporizing chamber 14. This cycle of fluid vaporization and condensation is continuously repeated so as to transfer heat from the steam chest 15 to the radiator 10 where it is dissipated to the room air.

The rate of heat transfer is dependent upon the amount of wetted surface of the vaporizing tube 14. The amount of wetted surface in turn is dependent upon the amount of vaporizable fluid introduced from the movable chamber 20 into the trap 13 and thence into the vaporizing tube 14. This in turn depends upon the extent of movement of the chamber 20 which is controlled directly by the thermostat 25 in response to variations in the room air temperature from a predetermined value, which is set by the adjusting screw 31. Thus, when the room air temperature falls below this predetermined value, the bellows 27 is contracted, thereby permitting the springs 29 to raise the chamber 20 to increase the rate of heat transfer. Conversely when the room air temperature exceeds the predetermined value, the bellows 27 is expanded and operates through the lever 28 to lower the control chamber 20 and thereby decrease the rate of heat transfer.

When the movable fluid control chamber 20 is lowered, fluid is drained from the condensate trap 13 into the chamber 20. This removes or extracts fluid from the fluid vaporizing and condensing enclosure constituted by the tube 14 and the radiator 10 and thereby renders the fluid inactive to transfer heat. Whenever all of the fluid in the system is accumulated in the chamber 20, there is no transfer of heat from the steam chest 15 to the radiator 10. On the other hand, when the chamber 20 is raised so that all of the fluid is drained therefrom into the trap 13, the maximum rate of heat transfer between the steam chamber 15 and the radiator 10 is obtained. With proper proportion and adjustment, the room thermostat 25 will always tend to move the control chamber 20 to that position at which the proper amount of fluid is introduced into the heat transfer system to produce transfer of heat from the steam chest to the radiator 10 at the proper rate to maintain the room air temperature at a substantially constant value, this value being determined by adjustment of the screw 31. Hence, by means of the present invention thermostatically modulated control of the transfer of heat from a source to a heat dissipating body to maintain a substantially constant predetermined temperature condition may be readily effected.

Fig. 2 shows a modified form of fluid control chamber for introducing and extracting fluid from the condensate return trap 13 under the control of the thermostat 25. In this modification, the fluid control chamber 20a is in the form of a compressible bellows. The lever 35 is pivotally mounted at its right-hand end and biased by the spring 29 to balance the bellows 20a against atmospheric pressure exerted thereon due to the exhaustion of the heat transfer system. The bellows 27 of the room thermostat 25 operates upon lever 35 to compress and expand the fluid control bellows 20a and thereby introduce and withdraw fluid from the trap 13 to render the fluid active and inactive. In other respects, the operation of the heat transfer system is substantially the same as previously described.

In the form of the invention shown in Fig. 3, the position of the movable fluid control chamber 20 is controlled by the expansible bellows 36 which contains a small amount of vaporizable fluid 37 and is provided with an electric heating unit 38 for vaporizing the fluid 37 to expand the bellows 36, in accordance with the heating action of unit 38. The heater 38 is controlled by the room thermostatic switch 39 and is supplied with power from the transformer 40. Switch 39 is shown as of the bimetallic type although any other well known type may be employed.

In the operation of the arrangement of Fig. 3, as long as the heater 38 remains de-energized, the bellows 36 contracts and thereby lowers the fluid control chamber 20 so as to drain substantially all of the fluid from the heat transfer system and thereby render the fluid inactive. Upon energization of heater 38 by closure of the contacts of the room thermostatic switch 39, the fluid in the bellows 36 becomes heated and is gradually expanded to introduce fluid from the control chamber 20 into the heat transfer system, and thereby render the fluid active in transferring heat. The amount of fluid rendered active depends upon the amount of heating of the fluid in the bellows 36.

With the room thermostat 39 provided with a preheat coil 41, as shown, the energization of the electric heater 38 and therefore the expansion of the bellows 36 may be controlled so as to effect intermittent energization of the heater 38. This insures introduction of the proper amount of fluid from the chamber 20 into the heat transfer system to maintain the desired room air temperature at which the thermostat 39 is set to respond. In accomplishing this result, the preheat coil 41 is immediately energized upon the closure of the contacts of thermostat 39 and provides an auxiliary heating effect which serves to raise the temperature of the bimetallic blade of thermostat 39 slightly above the temperature of the ambient room air. As a result, the thermostat 39 opens its contact to interrupt the energization of the heating unit 38 after a brief interval of heating. As soon as the contacts of thermostat 39 are opened, the preheat coil becomes de-energized and thermostat 39 then begins to cool so as to reclose its contact. This action is repeated so that the heater 38 is intermittently energized, the relative time of energization and de-energization depending upon the temperature of the ambient room air surrounding the thermostat 39. As a result of the intermittent energization and de-energization of the heater 38, the bellows 36 is expanded the proper amount to move the control chamber 20 to the proper position to maintain the rate of heat transfer between the vaporizing tube 14 and the room air heating radiator 10 at a predetermined desired value.

In the modification shown in Fig. 4, the position of the movable fluid control chamber 20 is controlled by the cam 43 which is rotated by the reversible electric motor 44 under the control of the double contact room thermostatic switch 45, the electric power being supplied from the transformer 40. The cam 43 is rotated by the reversible electric motor 44 preferably through speed reducing gearing 46 to operate the movable fluid control chamber 20 between lower and upper limits of travel. The spring 29 serves to maintain the chamber 20 in operating engagement with the cam 43. The limit switch 47 serves to stop the motor 44 at the lower limit of travel of the control chamber 20 and the limit switch 48 similarly serves to stop motor 44 at the upper limit of travel of the chamber 20.

In operation the thermostat 45 is responsive to the heating action of the radiator 10 to raise and lower the room air temperature above and below the predetermined value at which the bimetallic thermostatic blade is maintained in the midposition between the two contacts as indicated in the drawings. When the room air temperature exceeds the predetermined value, the blade of the thermostatic switch 45 will move into engagement with its right-hand contact, thereby energizing motor 44 to rotate the cam 43 so as to lower the fluid control chamber 20. With the cam 43 driven through speed reducing gearing 46 so that an appreciable time interval is required to move the control chamber 20 from the maximum to the minimum position, as for example 15 minutes, the decreasing rate of heat transfer resulting from the gradual draining of the fluid from the condensate trap 13 into the chamber 20 will after a certain time decrease the room air temperature to the value at which the thermostatic blade of the thermostat 45 returns to the midposition. Thereupon the motor 44 is de-energized and the control chamber 20 is maintained stationary.

In case the decreased rate of heat transfer becomes such that the temperature of the room air should fall below the predetermined value, the blade of the thermostat 45 then will move into engagement with the left-hand contacts to energize the motor 44 for operation in the reverse direction. This will rotate cam 43 in the direction required to raise the control chamber 20, thereby gradually introducing additional fluid into the trap 13 to correspondingly increase the rate of heat transfer. As soon as the increased rate of heat transfer serves to bring the room air temperature back to the predetermined value, the blade of the thermostat 45 again returns to the midposition. In this way the double contact thermostat 45 will continue to energize the reversible electric motor 44 so as to position the control chamber 20 at the proper level for maintaining the amount of fluid active in heat transfer service at the value which will serve to maintain the temperature of the room air to which the thermostat 45 responds substantially at the predetermined desired value.

In the modification shown in Fig. 5, the fluid control chamber 20 remains stationary and the volume of fluid therein is regulated by the movable displacement member 50 which may be of any suitable form and material. The armature 51 of the electromagnet 52 is carried by the movable displacement member 50. The spring 53 serves to raise the displacement member 50 out of the fluid in chamber 20 when the electromagnet 52 is de-energized. The magnetizing winding 54 is energized under the control of the rheostat 55 having the bimetallic thermostatic operating element 56 with electric power supplied from the transformer 40.

In operation, when the displacement member 50 is raised by the spring 53, the fluid of the heat transfer system is drained from the condensate trap 13 into the control chamber 20. This results in reducing the rate of heat transfer to the minimum value. Under these conditions, the energization of the magnetizing winding 54 is also at the minimum value due to the inclusion of substantially all of the regulating resistance 55 in the energizing circuit. As the thermostatic element 56 responds to a decrease of the ambient air temperature, some of the resistance 55 is removed from the energizing circuit of the magnetizing winding 54. As a result, the attractive force exerted on the armature 51 is increased thereby compressing the spring 53 to lower the displacement member 50 and thereby introduce fluid from the chamber 20 into the condensate trap 13. As more and more of the resistance 55 is removed from the energizing circuit of the magnetizing winding 54, the displacement member 50 is lowered farther and farther into the chamber 20 thereby displacing more and more of the fluid therefrom into the trap 13. When all of the resistance 55 is removed from the energizing circuit of the winding 54, the maximum displacement of fluid from the chamber 20 is obtained.

With provision made for adjusting the setting of the bimetallic actuating element 56, different amounts of the resistance 55 may be included in the energizing circuit of the magnetizing winding 54 at any predetermined temperature. In this way, different amounts of the fluid in chamber 20 may be displaced so as to provide different rates of heat transfer to maintain the room air to which the element 56 is responsive at any selected predetermined values. The rate of heat transfer will be increased and decreased automatically upon variation of the temperature from the predetermined selected value by the resulting movement of the bimetallic element 56 to effect a variation in the amount of fluid in the chamber 20 with a corresponding variation in the rate of heat transfer.

In Fig. 6, the movement of the control chamber 20 is controlled by the piston 60 which operates when the cylinder 61 is supplied with fluid under pressure from the pipe 62 under the control of the three-way slide valve 63. Valve 62 is controlled by the thermostatic actuating element 64.

In operation, the bimetallic thermal responsive element 64 is adjusted so that when the ambient air is at a predetermined temperature, the slide valve 63 is positioned so as to prevent both entrance and exhaust of fluid from the cylinder 61. In case the air temperature should decrease, the thermostatic element 64 moves so as to raise the slide valve 63 slightly and thereby admit fluid under pressure from the pipe 62 into the cylinder 61. As a result, the piston 60 raises the fluid control chamber 20 against the force of biasing spring 29 and thereby drains fluid from the chamber 20 into the trap 13 to increase the rate of heat transfer. Conversely, when the air temperature rises above the predetermined value, the bimetallic thermal element 64 operates valve 63 so as to exhaust some of the fluid from the cylinder 61. This results in lowering the chamber 20 and thereby draining fluid from the condensate return trap 13 to decrease the rate of heat transfer. Preferably a control orifice 65 is provided for regulating both the rate of entrance and exhaust of fluid from cylinder 61. Thus the control arrangement of Fig. 6 operates to modulate the rate of heat transfer so as to maintain the room air temperature substantially at the predetermined value at which the thermostatic control element 64 is set.

What I claim as new and desire to secure by Letters Patent of the United States is:

1. Apparatus for maintaining a predetermined temperature condition including means operable in response to variations in said temperature condition, a condensible fluid heat supply source, a separate fluid vaporizing and condensing system for transferring latent heat from said source to regulate said temperature condition and having a sealed and evacuated enclosure with a condensate trap interconnected between the vaporizing and condensing parts thereof, a movable control chamber provided with separate flexible conduits connected above and below the condensate level of said trap for accumulating the fluid of said separate system therein to render the fluid inactive, and mechanism movable under the control of said temperature responsive means for regulating the level of said control chamber to vary the heat transfer action of said separate system as a function of the variations in said temperature condition.

2. A thermostatic system comprising means operable in response to variations in a predetermined temperature condition from a predetermined value, a condensible fluid heat supply means, a separate fluid vaporizing and condensing means for transferring latent heat at a variable rate from said heat supply means to regulate said temperature condition and having a sealed and evacuated enclosure with a condensate trap interconnected between the vaporizing and condensing parts thereof, a movably mounted fluid reservoir having a flexible drain connection below the condensate level of said trap and a flexible pressure equalizing connection above the condensate level of said trap and movable under the control of said temperature responsive means for varying the relative level of fluid in said trap and reservoir to vary the rate of heat transfer when said temperature condition varies from said predetermined value.

3. In a thermostatic heat transfer device, the combination with a condensible heat supply source, of a sealed and evacuated enclosure having a separate fluid vaporizing surface in heat transfer relation with said condensible fluid heat supply source and a condensing surface for condensing and returning the separate fluid to said vaporizing surface and provided with a condensate trap in the path of the returning fluid, a movable fluid control chamber having flexible conduits communicating at different levels with said trap for introducing the separate fluid into and withdrawing the separate fluid from said trap for controlling the transfer of heat between said surfaces to regulate a predetermined temperature condition, and thermostatically controlled mechanism responsive to said temperature condition for moving said fluid control chamber.

4. In combination, a sealed and evacuated enclosure substantially free of non-condensible gases and charged with a predetermined volume of liquid to form a fluid vaporizing and condensing heat transfer device and having a condensate trap interconnected between the vaporizing and condensing parts thereof, a movable control chamber having a flexible drain connection below the condensate level of said trap and a flexible pressure equalizing connection above the condensate level of said trap and provided with biasing means for moving the chamber to drain fluid from said trap for accumulating the fluid of the system therein to render the fluid inactive, and thermostatically controlled movable means responsive to the heat transfer action of the device and connected to move said control chamber against its bias for varying the amount of fluid in said chamber to regulate said action.

5. In combination, a fluid vaporizing and condensing heat transfer device having a condensate trap, a fluid control chamber movably connected to drain fluid into and from said trap and having a pressure equalizing connection with said system, and thermostatically controlled mechanism responsive to the heat transfer action of the device for moving said control chamber to regulate the amount of fluid active in the heat transfer device.

6. A fluid vaporizing and condensing heat transfer device having a condensate return trap, an expansible fluid control chamber connected to introduce and extract fluid from said trap, and thermostatic mechanism for moving said expansible chamber to regulate the amount of fluid active in the heat transfer device.

7. In combination, a sealed and evacuated fluid vaporizing and condensing heat transfer device having a condensate return trap, a movable fluid control chamber operable above and below the condensate level of said trap and provided with flexible drain and pressure equalizing connections therewith for introducing fluid into and extracting fluid from said trap to regulate the heat transfer action of said system, biasing means for actuating said chamber below the condensate level of said trap, and thermostatically controlled mechanism responsive to the heat transfer action of the device for actuating said movable control chamber against said biasing means.

8. In combination, thermostatic means having a member movable in accordance with variations of a predetermined temperature condition above and below a predetermined value, and a fluid vaporizing and condensing heat transfer device for controlling said temperature condition and having a condensate trap interconnected between the vaporizing and condensing parts thereof and a movable control chamber provided with flexible sealed connections with said trap and movable under the control of said thermostatic means to vary the amount of fluid active in the device in accordance with the movement of said member.

9. In combination, a fluid vaporizing and condensing means having a condensate trap interconnected between the vaporizing and condensing parts thereof and a movable control chamber provided with flexible sealed connections with said trap for transferring heat at a variable rate from a heat supply means to regulate a predetermined temperature condition, thermostatic means responsive to said temperature condition and having a member movable in one direction from a predetermined position upon variation of said temperature condition above a predetermined value, and in the opposite direction upon variation of said temperature condition below said value, and operating connections between said member and said movable control chamber.

10. In combination, a sealed and evacuated fluid vaporizing and condensing device for transferring heat at a variable rate from a heat supply means to regulate a predetermined temperature condition and having movable fluid control means for varying the amount of fluid active in said device to vary the rate of heat transfer effected thereby, means normally biasing said movable fluid control means for movement to render the fluid inactive and means for operating said movable control means against said normal biasing means including an expansible device having an electric heating element.

11. In combination, a thermostatic circuit controlling device, an expansible device having an electric heater energized under the control of said device, a sealed and evacuated fluid vaporizing and condensing heat transfer device having a condensate trap interconnected between the vaporizing and condensing parts thereof, a movable fluid control reservoir having a flexible drain connection below the condensate level of said trap and a flexible pressure equalizing connection above the condensate level of said trap and connected to be operated by said expansible device to vary the relative level of the fluid in said trap and reservoir.

MARCUS E. FIENE.